United States Patent [19]

Poisel et al.

[11] Patent Number: 5,430,544
[45] Date of Patent: Jul. 4, 1995

[54] PROCESS AND AN APPARATUS FOR CORRECTING THE MEASURING SIGNALS OF A FIBER OPTIC GYRO

[75] Inventors: Hans Poisel, Leinburg; Gert Trommer, Munich, both of Germany

[73] Assignee: Deutsche Aerospace AG, Munich, Germany

[21] Appl. No.: 184,103

[22] Filed: Jan. 21, 1994

[30] Foreign Application Priority Data

Jan. 21, 1993 [DE] Germany .............. 43 01 479.8

[51] Int. Cl.$^6$ .................. G01C 19/72; G01P 9/00
[52] U.S. Cl. .................. 356/350; 356/149
[58] Field of Search .................. 356/350, 149, 140

[56] References Cited

U.S. PATENT DOCUMENTS 5,150,956 10/1992 Bühler et al. .................. 356/350
5,227,860 7/1993 Hartl et al. .................. 356/350

FOREIGN PATENT DOCUMENTS 3926313 2/1991 Germany .

OTHER PUBLICATIONS

Electron Letters, vol. 25, 1989, p. 682, "Monolithic 4×4 Single-Mode Fused Coupler".

Primary Examiner—Robert P. Limanek
Assistant Examiner—Alexander Oscar Williams
Attorney, Agent, or Firm—Evenson, McKeown, Edwards & Lenahan

[57] ABSTRACT

In the case of a fiber optic gyro having a 4×4-coupler, the two arms of the coupler which are not connected with the fiber coil are each connected with a monitoring detector. From the output signals of these monitoring detectors, in the case of a desired wavelength, a reference or desired quotient is formed. During the operation of the fiber optic gyro, an actual quotient is in each case formed from these output signals and is compared with the stored desired quotient. The wavelength of a semiconductor laser is controlled by controlling the operating current and/or the temperature of the light source (L) such that the two quotients are identical. The measuring signals will then be error free.

9 Claims, 1 Drawing Sheet

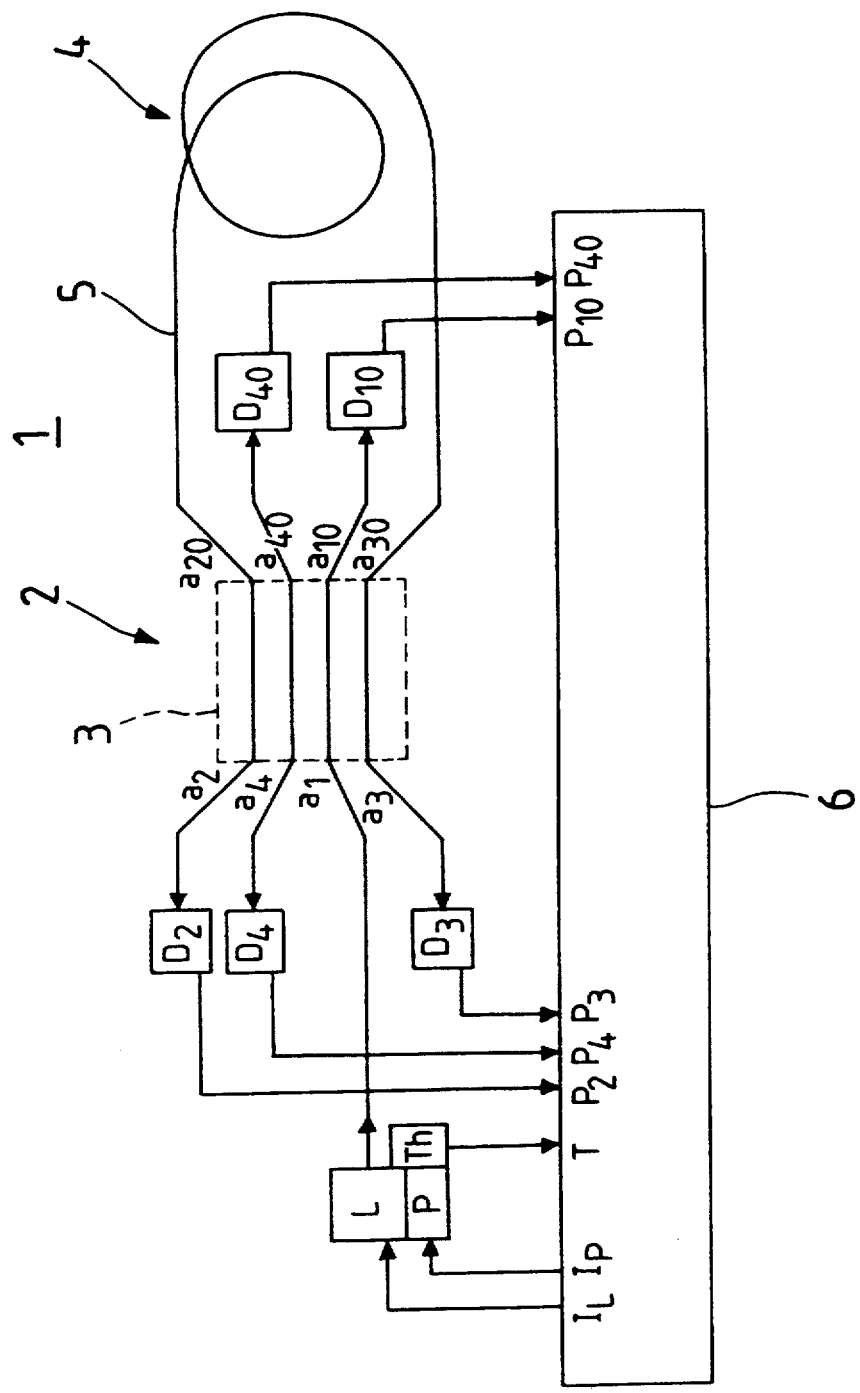

PROCESS AND AN APPARATUS FOR CORRECTING THE MEASURING SIGNALS OF A FIBER OPTIC GYRO

BACKGROUND AND SUMMARY OF THE INVENTION

This invention relates to a process and an apparatus for correcting the measuring signals of a fiber optic gyro.

From German Patent document DE-OS 39 26 313, it is known that fiber optic gyros can be operated close to the quadrature point by means of 4×4-couplers without the requirement of an additional phase modulator. In the range of this quadrature point, the output signals of the detectors, usually photo diodes, have a sinusoidal dependence on the Sagnac-phases which determine the rotational speed of the gyro so that such gyros have a maximal sensitivity particularly in the case of low rotation rates.

The 4×4-coupler of such a fiber optic gyro comprises four adjoining mono-mode optical fibers which are fused to one another and have four gates or arms on both sides of its coupling range. On one side of its coupling range, a light source, preferably an ELED, is connected with one arm, and one detector is respectively connected with at least two other arms, and as a rule, all three remaining arms. On the other side of the coupling range, the two ends of a fiber coil, which is wound from a mono-mode optical fiber, are connected to two arms. The other two arms remain free. These free arms of the coupler on the fiber-coil-side may be connected with monitoring circuits by means of which, for example, the intensity of the light source is tested and is taken into account in the measuring results. A special development of these monitoring circuits is not described in the above-mentioned German Patent document DE-OS 39 26 313.

The operation of the fiber gyro is as follows. The light of the light source is beamed into one of the four input arms of the 4×4-coupler and is uniformly distributed by the coupler to the two output arms to which the ends of the fiber coil are connected. The resulting split light waves pass through the mono-mode fiber coil in opposite directions and are guided back into the two arms of the coupler. In the interior coupling range of the coupler, these light portions interfere with one another and the result is a phase/amplitude transformation. In this manner, the Sagnac phase shift of the light waves, which circulate in opposite directions in the fiber coil, caused by a rotation of the gyro is changed into alterations of intensity on the coupler arms on the light source side. These alterations of intensity can be detected by photo diodes. Without being influenced by rotations of the gyro, a portion of the light beamed into the one arm leaves the coupler on the two coil-side free output arms.

The output signals of the photo diodes as a function of the Sagnac phase $\phi_S$ and the thus determined rotational speed as well as the intensity $\phi_O$ of the light source are obtained by:

$$P_i = (A_i + B_i \cos(\phi_S + C_i)) \cdot I_O \quad (i=2,3,4) \qquad (1)$$

wherein the gyro coefficients $A_i$, $B_i$ and $C_i$ are functions of the coupling constants $K_{ij}$ between the individual light channels in the coupling range, with i and j being from 1 to 4. These coefficients may be determined in a gauging procedure in that the fiber gyro is set into rotation on a gauged revolving table at several known rotational speeds. The output signals $P_i$ as a function of the known rotational speed are measured and recorded. Finally, the unknown gyro coefficients are calculated, preferably by means of a so-called least square fit. The thus obtained coefficients are then stored in an analysis circuit, for example, within a computer. By means of the now known coefficients, the respective rotational speed can be determined by the analysis of the above-mentioned equation (1).

The problem which occurs in this case is that the center wave length of the light source, for example, of an edge-emitting luminescent diode of a superluminescent diode or of a laser diode, varies because of temperature influences. However, a variation of the wavelength also results in a variation of the "coupling constants" in the 4×4-coupler with an increase of the wavelength causing a stronger coupling. The above gyro coefficients are therefore also a function of the wavelength. If these coefficients at a certain desired wavelength were determined by means of the gauging procedure, then the analysis of the above equation (1) by means of these coefficients results in an incorrect rotational speed if, during the measurement, the light source has a wavelength which deviates from the desired wavelength.

For a correct determination of the rotational speed, the center wavelength of the light source would therefore have to be stabilized to the desired wavelength adjusted during the gauging procedure. The wavelength of a semiconductor light source, such as a laser diode or a luminescent diode, constructed on a chip may be adjusted by the variation of the chip temperature, for example, by means of a Peltier element, and by the variation of the operating or injection current. It would therefore be obvious to stabilize the chip temperature, for example, by means of a combination of a Peltier element for heating and cooling and a thermal resistor for determining the chip temperature, and, in addition, to keep the injection current constant. However, the application range of fiber gyros frequently includes such a broad temperature range, for example, between approximately −60° C. and +120° C. that, when the dimensions are reasonable, the efficiency of a Peltier element is no longer sufficient for stabilizing the chip within the whole exterior temperature range to a desired temperature.

There is therefore needed a process and apparatus by means of which an easy compensation of the errors of the output signals may be carried out, in which case, this compensation may take place over a wide temperature range.

According to the present invention, this need is met by a process and apparatus for correcting the measuring signals of a fiber optic gyro which measures the rotational speed and which comprises a 4×4-coupler consisting of four adjoining optical fibers which are fused to one another and have four arms at both sides of its coupling range. A light source, preferably a semiconductor light source, such as a laser or the like, radiates with a specified desired wavelength. The light source is connected on one side of the coupling range with one arm, and one measuring detector respectively is connected with at least two other arms. On the other side of the coupling range, two arms are connected with the two ends of a fiber coil wound from a mono-mode optical fiber. The measuring signals which were falsified by the temperature-caused drift of the wavelength of the light source, are corrected. The output signals on the two free arms of the coupler on the fiber coil side are measured at the desired wavelength and at the respective actual wavelength and a desired or actual ratio is determined from the respective output signals. The temperature and/or the operating current of the light source are controlled such that the actual ratio is equal to the desired ratio.

This invention is based on the consideration that, because of the above-mentioned constructions, a variation of the chip temperature must take place as a function of the outside temperature, which, in turn, results in a variation of the center wavelength. This variation may either be compensated by a corresponding variation of the injection current or may also be taken into account in the signal analysis. Under these conditions, an exact measurement of the actually existing wavelength is therefore a prerequisite for keeping the wavelength constant. By means of the present invention, a simple measuring of the center wavelength of the radiation coupled from the light source into the coupler is therefore possible for the purpose of the stabilization.

The solution found by means of the present invention is simple in that the output signals on the free arms of the coupler on the fiber coil side are utilized. The output signals $P_{10}$ and $P_{40}$ of the monitoring diodes connected with the free arms of the coupler are obtained by:

$$P_{10}(\lambda) = S_{10}(K_{ij}(\lambda)) \cdot I_O \quad (2)$$

$$P_{40}(\lambda) = S_{40}(K_{ij}(\lambda)) \cdot I_O \quad (3)$$

These output signals are, in each case, a product of a transmission function $S_{10}$ or $S_{40}$ and of the intensity $I_O$ of the light source. The transmission functions are, in turn, a function of the coupling constants $K_{ij}$ which themselves are a function of the wavelength $\lambda$. Thus, the output signals $P_{10}$ and $P_{40}$ also depend on the wavelength.

As mentioned above, in the case of optical directional couplers of the concerned type, as the wavelength increases, the coupling between adjacent channels (the optical fibers fused to one another) in the coupling region of the coupler will also influenced. On the other hand, the luminous power which is coupled from the channel, which is directly connected to the light source, into a neighbored or adjacent channel, in this case the one free arm of the 4×4-coupler on the fiber coil side, will increase with increasing wavelength; on the other hand, the power, which is transmitted from the light source to the other free arm on the fiber coil side directly via the common optical fiber or channel, decreases; see for example D. Mortimore, *Electron. Lett.* 25, 1989, page 682.

This important recognition is based on the fact that the measuring signals will be correct when the quotient of the output signals on the two free arms of the coupler on the fiber coil side remains constant. The quotient for the actual wavelength is therefore compared with the quotient for the desired wavelength which was determined by means of the above-mentioned gauging procedure. By controlling the injection current of the light source and/or its temperature, for example, by controlling the current of a Peltier element, the center wavelength of the radiation emitted by the light source is controlled such that the measured actual quotient is equal to the stored desired or reference quotient.

By means of these measures, a correction of the measuring signals is possible also in the case of a variation of the center wavelength within a wide temperature range.

In order to also take into account fluctuations of the intensity of the light source, during the signal analysis, the output signals of the measuring detectors on the side of the light source may be standardized by relating them to the output signal of one of the monitoring detectors on the fiber coil side. The quotient of the these two output signals is then no longer a function of the intensity of the light source. Therefor, the Sagnac phase which is to be determined from this quotient will also no longer depend on the intensity of the light source.

Other objects, advantages and novel features of the present invention will become apparent from the following detailed description of the invention when considered in conjunction with the accompanying drawings.

BRIEF DESCRIPTION OF THE DRAWINGS

The sole figure is an embodiment of the present invention in which a fiber gyro is illustrated. The gyro comprises an analysis and control circuit for correcting the measured values according to the present invention.

DETAILED DESCRIPTION OF THE DRAWINGS

A fiber gyro 1 comprises a 4×4-directional coupler 2 which has, on both of its sides, four arms $a_1$, $a_2$, $a_3$, $a_4$ and $a_{10}$, $a_{20}$, $a_{30}$, $a_{40}$, respectively. In the figure, the coupling range of the coupler is illustrated by an interrupted line and has the reference number 3. The coupler is conventionally made of four adjoining mono-mode optical fibers which are surrounded by a tube made of special quartz glass. The tube has a refraction index that is lower than that of the optical fibers. This arrangement is subsequently heated and is drawn until the luminous power of light radiation coupled into an arm is uniformly distributed to the four output arms.

A light source, in this case, an ELED L is connected with arm $a_1$; one measuring detector $D_2$, $D_3$ and $D_4$ is connected to arms $a_2$, $a_3$ and $a_4$, respectively.

The opposing arms $a_{20}$ and $a_{30}$ are connected with two ends of a fiber coil 4 made of a long wound mono-mode optical fiber 5. The free arms $a_{10}$ and $a_{40}$ are each respectively connected with a monitoring detector $D_{10}$ and $D_{40}$.

The outputs of all detectors, that is, of the measuring detectors $D_2$, $D_3$ and $D_4$ as well as the monitoring detectors $D_{10}$ and $D_{40}$ are connected with an analysis and control circuit 6 which also contains a gyro computer.

A Peltlet element P, whose operating current $I_p$ is adjusted by the analysis and control circuit 6, is also connected with the chip of the ELED L. A thermal resistor Th, which measures the chip temperature T and supplies the temperature to the analysis and control circuit 6, may also be connected with the chip. The injection current $I_L$ for the laser diode L is also adjusted by the analysis and control circuit 6.

The output signals $P_2$, $P_3$ and $P_4$ of the measuring diodes $D_2$, $D_3$ and $D_4$ provided by the above-mentioned equation (1) are supplied to the analysis and control circuit 6, as well as the output signals of the monitoring diodes $D_{10}$ and $D_{40}$ which are defined by the above-mentioned equations (2) and (3).

By means of the above-mentioned gauging procedure for the determination of the coefficients $A_i$, $B_i$ and $C_i$, when the desired or reference wavelength is $\lambda_O$ in the analysis and control circuit 6, the ratio or the quotient $(P_{10}/P_{40})_O$ is determined and is stored together with the coefficients.

During the operation of the fiber optic gyro, the ratio of the two output signals $P_{10}$ and $P_{40}$ of the two monitoring diodes $D_{10}$ and $D_{40}$ will now be constantly determined constantly and will be compared with the stored desired ratio. When the two quotients differ, by means of adjusting the injection current $I_L$ and/or of the Peltier current $I_P$, the center wavelength of the radiation emitted by the laser L will be controlled such that the respective actual ratio of the output signals $P_{10}$ and $P_{40}$ is equal to the stored reference or desired ratio. Such an adjusting of the center wavelength, at which the fiber optic gyro continues to remain gauged, is much simpler and requires less energy than a control to an always constant chip temperature.

In order that the Sagnac phase is independent of fluctuations of the intensity $I_O$ of the light source L, the Sagnac phase and thus the rotational speed to be measured may be determined from the quotient $P_i/P_{10}$ at:

$$\frac{P_i}{P_{10}} = \frac{A_i + B_i \cos(\phi_S + C_i)}{S_{10}} \quad (4)$$

The index i is in each case 2, 3 or 4 corresponding to the index of the measuring detectors $D_2$, $D_3$ and $D_4$. The expression on the right side of the equation (4) no longer depends on the intensity $I_O$ of the light source so that, from it, the correct rotational speed may then be calculated.

As mentioned above, the output signals on the arm of the coupler on the fiber coil side, which is directly connected to the light source, and the output signals of the other arms depend on the wavelength of the light source in a substantially different manner. As the wavelength increases the coupling factor between neighbored fibers increases, whereas the direct transmitted power decreases. Therefore, it is important that one of the monitoring detectors $D_{10}$ or $D_{40}$ is connected to the optical fiber which directly leads to the light source. The connection of the other elements - second monitoring detector and fiber coil –is more or less optional.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A process for correcting measuring signals of a fiber optic gyro measuring rotational speed, said gyro having:
   a 4×4 coupler including four adjoining optical fibers fused to one another in a coupling range with four arms at both sides of the coupling range;
   a light source adapted to radiate light of a nominal wavelength and connected to one of said four arms on one side of the coupling range;
   measuring detectors connected to at least two other of said four arms on said one side, whereby the output signals of these detectors are related to the rotational speed;
   a fiber coil wound from a mono-mode optical fiber and connected with its two ends to two of the four arms on the other side of the coupling range, so that the other two arms of the coupler on this side are free arms and one of said free arms is the end of the optical fiber connected to the light source;
   wherein the measuring signals of the measuring detectors on the side of the light source which were disturbed by temperature-caused drift of the wavelength of the light source are corrected, the correction process comprising the steps of:
   measuring in a gauging procedure the output signals on the two free arms of the coupler on the fiber coil side at the nominal wavelength;
   determining the ratio from the said output signals and storing this ratio as reference ratio;
   measuring the actual output signals on the said two free arms of the coupler on the fiber coil side;
   determining the actual ratio from the actual output signals; and
   controlling at least one of the temperature and the operating current of the light source such that the actual ratio is equal to the reference ratio.

2. A process according to claim 1, wherein the intensity of the output signals of the arms connected to the measuring detectors on the side of the light source is related to the intensity of the output signal of one of the two free arms on the side of the fiber coil,
   this relation is used to generate a standardized value for the output signal, and wherein
   the said standardized value is used to determine the Sagnac phase which forms a measurement for the rotational speed.

3. A fiber optic gyro, comprising:
   a 4×4-coupler having four adjoining optical fibers which are fused to one another and have four arms at both sides of a coupling range;
   a light source which radiates with a specified desired wavelength, said light source being connected on one side of the coupling range with one arm;
   measuring detectors being connected with at least two other arms on the one side;
   a fiber coil having two arms being connected with its two ends on the other side of the coupling range, said fiber coil being wound from a mono-mode optical fiber;
   monitoring detectors being connected with the two free arms of the coupler on the fiber coil side, the output signals of each monitoring detector being supplied to an analysis and control circuit in which the desired ratio of the two output signals at the desired wavelength is stored, and the actual ratio is determined, in that at least one of: 1) a heating and cooling device for the light source is provided for adjusting the temperature of the light source, and 2) a device for adjusting the operating current of the light source is provided, each device receiving adjusting signals from the analysis and control circuit such that the actual ratio is identical to the desired ratio; and
   wherein as the heating and cooling device, a Peltier element is provided in connection with a thermal resistor for determining the temperature of the light source.

4. An apparatus according to claim 3, wherein when a semiconductor light source is used, the heating and cooling device is mounted directly on the chip of the light source.

5. An apparatus according to claim 4, wherein as the heating and cooling device, a Peltier element is provided in connection with a thermal resistor for determining the temperature of the light source.

6. An apparatus according to claim 3, wherein the measuring detectors connected with the coupler on the light source side are connected with the analysis and control circuit in which the output signals of these measuring detectors are standardized to the output signal of one of the monitoring detectors and, from the standardized values, the Sagnac phase is determined in the analysis and control circuit, the Sagnac phase relating to a measurement for the rotational speed.

7. An apparatus according to claim 4, wherein the measuring detectors connected with the coupler on the light source side are connected with the analysis and control circuit in which the output signals of these measuring detectors are standardized to the output signal of one of the monitoring detectors and, from the standardized values, the Sagnac phase is determined in the analysis and control circuit, the Sagnac phase relating to a measurement for the rotational speed.

8. An apparatus according to claim 4, wherein the measuring detectors connected with the coupler on the light source side are connected with the analysis and control circuit in which the output signals of these measuring detectors are standardized to the output signal of one of the monitoring detectors and, from the standardized values, the Sagnac phase is determined which forms a measurement for the rotational speed.

9. A fiber optic gyro, comprising:

a 4×4-coupler having four adjoining optical fibers which are fused to one another and have four arms at both sides of a coupling range;

a light source which radiates with a specified desired wavelength, said light source being connected on one side of the coupling range with one arm;

measuring detectors being connected with at least two other arms on the one side;

a fiber coil having two arms being connected with its two ends on the other side of the coupling range, said fiber coil being wound from a mono-mode optical fiber;

monitoring detectors being connected with the two free arms of the coupler on the fiber coil side, the output signals of each monitoring detector being supplied to an analysis and control circuit in which the desired ratio of the two output signals at the desired wavelength is stored, and the actual ratio is determined, in that at least one of: 1) a heating and cooling device for the light source is provided for adjusting the temperature of the light source, and 2) a device for adjusting the operating current of the light source is provided, each device receiving adjusting signals from the analysis and control circuit such that the actual ratio is identical to the desired ratio; and wherein the measuring detectors connected with the coupler on the light source side are connected with the analysis and control circuit in which the output signals of these measuring detectors are standardized to the output signal of one of the monitoring detectors and, from the standardized values, the Sagnac phase is determined in the analysis and control circuit, the Sagnac phase relating to a measurement for the rotational speed.

* * * * *